United States Patent [19]

Mohnhaupt

[11] Patent Number: 4,995,122
[45] Date of Patent: Feb. 26, 1991

[54] PORTABLE COMMODE

[76] Inventor: Elmer J. Mohnhaupt, P.O. Box 705, Evergreen, Colo. 80439

[21] Appl. No.: 214,947

[22] Filed: Jul. 5, 1988

[51] Int. Cl.$^5$ .............................................. A47K 11/02
[52] U.S. Cl. .......................................... 4/483; 4/451
[58] Field of Search ............. 4/449, 451, 460, 450, 4/483, 484

[56] References Cited

U.S. PATENT DOCUMENTS

| | | | |
|---|---|---|---|
| 2,893,017 | 7/1959 | Beck | 4/484 X |
| 3,319,263 | 5/1967 | Udden et al. | 4/452 |
| 3,503,080 | 3/1970 | Laufer et al. | 4/451 |
| 3,599,249 | 8/1971 | Reed | 4/451 |
| 3,600,719 | 8/1971 | Karr | 4/484 |
| 3,859,125 | 1/1975 | Miller et al. | 4/451 X |
| 4,161,793 | 7/1979 | Merchan | 4/449 X |
| 4,710,989 | 12/1987 | Grenthe | 4/449 |

*Primary Examiner*—Charles E. Phillips

[57] ABSTRACT

A portable commode is disclosed made of an outer base support, an inner base support and an upper seat part. The outer base support is configured as a rectangle with preformed creases in opposing walls where the walls are bent inwardly, forming a bow-tie shape. The inner base support may take any number of configurations. The seat part is like a box-lid with a hole in the center, and downwardly extending edges. When in use, the seat part rests upon the base supports. For storage and transport, the outer and inner base supports may be folded flat to fit within the undersurface of the seat part.

5 Claims, 2 Drawing Sheets

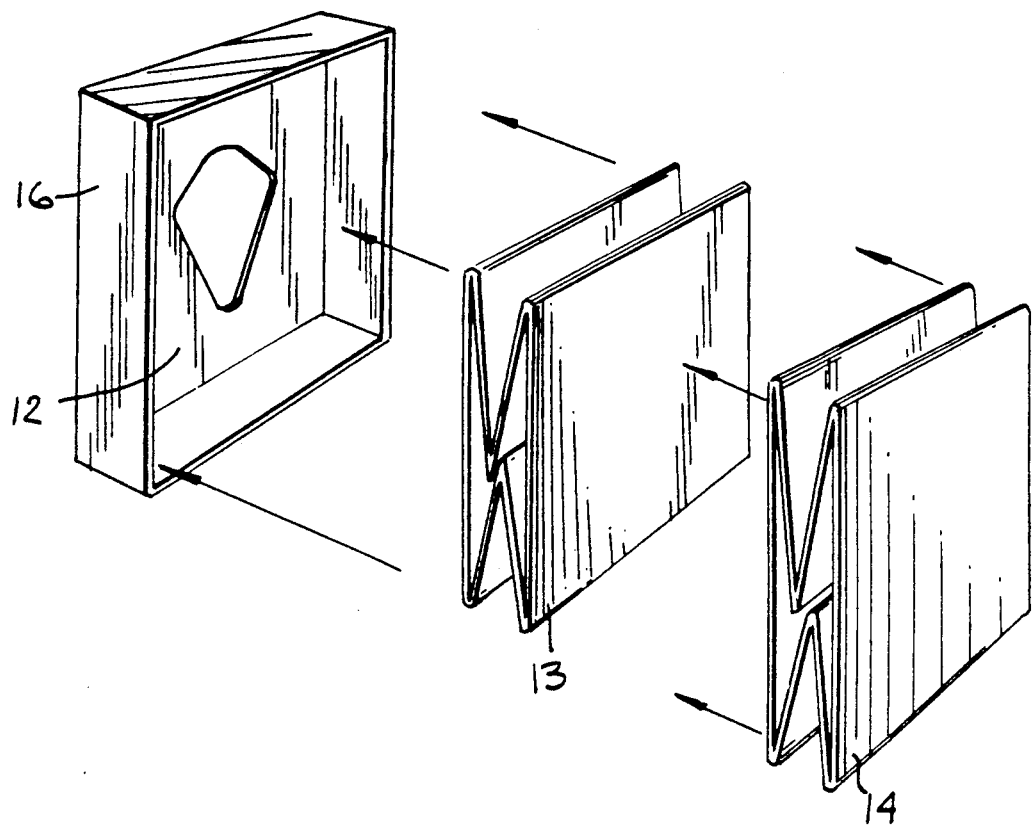
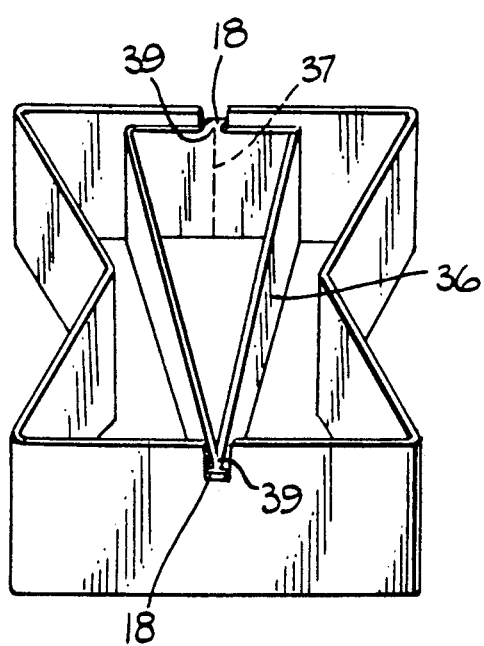

PORTABLE COMMODE

BACKGROUND OF THE INVENTION

This invention relates to portable commodes of the type used in the outdoors by campers and laborers.

Several different types of portable commodes have previously been devised for outdoor use by campers and laborers. Generally, the prior designs are characterized by being relatively bulky and by not being readily assembled; for example, the commode disclosed in U.S. Pat. No. 1,026,413 of Sullivan. Many of these prior portable commodes, such as the one disclosed in U.S. Pat. No. 873,749 of Herrick, were designed for relatively long-term installation and are not well adapted for use by campers and others who only stay at an outdoor site for a week or less. Previous portable commodes that were less bulky suffer from other drawbacks. A specific difficulty has been in combining a design whereby the commode is substantial enough to provide adequate support for the user, while still being capable of easy transport and assembly. See, for example, those commodes disclosed in U.S. Pat. No. 2,849,726 of Vay, and U.S. Pat. No. 3,579,655 of Sundberg. Most of the less bulky designs are based on a rectangular or box-like design that has limited strength and stability when made of desirable lightweight materials such as cardboard. Examples of commodes based on a box-like design are U.S. Pat. No. 4,710,989 of Grenthe, U.S. Pat. No. 3,600,719 of Kerr, U.S. Pat. No. 2,912,702 of MacKenzie and U.S. Pat. No. 2,893,017 of Beck. In addition, with many of the portable commodes now available, there is a disposal problem after use. See, for example, U.S. Pat. No. 4,606,080 of Clementino.

A need exists for a portable commode that will eliminate the above problems: a commode which is extremely compact and lightweight for transport and storage, yet very stable and capable of supporting even very large persons when in use and which can be disposed of easily either by burial or burning.

SUMMARY OF THE INVENTION

In accordance with the invention, the desired features described above are provided by a portable commode having three parts, and made of a biodegradable material such as corrugated cardboard or paperboard. The commode, that has an operational and a transport mode, is placed over a hole dug in the ground, and when it is no longer needed may be burned or buried. The three parts of the commode are an upper seat type portion of lid-like construction that is similar to a box lid, with an opening in the center of the top. The top portion is supported by both inner and an outer support bases, and fits tightly against the four corners of the outer base support. The outer base support is maintained in a six-sided bow-tie shape and the inner base support can be maintained in any number of shapes. In one embodiment, the inner base support can be maintained either in a six sided bow-tie shape or as an irregular hexagon. In another embodiment, the inner base support has a three-sided shape. Both the inner and outer base supports can be folded flat and stored inside the underside of the upper seat part. The present invention provides a portable commode capable of supporting a person weighing in excess of 200 pounds, while still being extremely lightweight, inexpensive, easy to transport and store, and capable of burning or burying.

Further properties and additional features of the invention will appear from the following specification in which preferred embodiments have been set forth in detail in conjunction with the accompanying drawings.

BRIEF DESCRIPTION OF THE DRAWINGS

FIG. 4 is an exploded view showing a portable commode according to the invention in its transport and storage mode.

FIG. 5 shows the inner and outer base supports of an embodiment of the invention, when utilizing a triangular base support.

DESCRIPTION OF THE PREFERRED EMBODIMENTS

Figure 1:
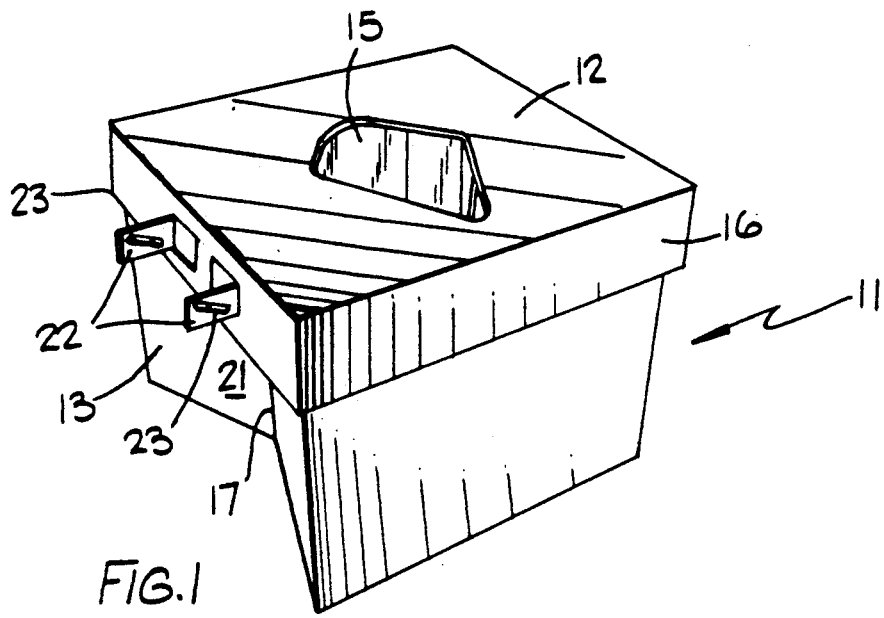
FIG. 1 shows a portable commode according to the invention in its operational mode.

Drawings 1-4 illustrate a preferred embodiment of the portable commode. As is apparent from the drawing of this embodiment in the transport and storage mode, referred to as the transport mode, FIG. 4, the portable commode 11 is made up of three parts; an upper seat part 12, an outer base support 13 and an inner base support 14. The upper seat part consists of a flat surface with an opening 15 and edges 16 to form a box-lid type element. The seat part remains in the same configuration when in the transport mode. The outer base support 13 is rectangularly shaped, with two opposing walls 25 and 26 being bent inwardly at preformed creases 17, thereby creating a bow-tie shaped support when in the operational mode, FIGS. 1, 2, 3 and 5. When in the transport mode, FIG. 4, the outer base support folds further inwardly at the preformed creases 17, so that the entire unit is compacted almost flat. The inner base support 14 is also rectangularly shaped, with two opposing walls 27 and 28 that tend to bend inwardly at preformed creases 19. In the operational mode, the inner base support 14 may be maintained so that the opposing walls 27 and 28 are bent inwardly, FIG. 2, or outwardly, FIG. 3. In the operational mode, the upper seat part 12 fits snugly over the top of the outer base support, and rests upon and is supported by both the outer and inner base supports. In the transport mode, the inner base support 14 and the outer base support 13 are folded nearly flat at the preformed crease, and can be stored within the underside of the seat part 12 as seen in FIG. 4. The base supports are folded by bending the opposing walls 25, 26, 27, 28 inwardly until the two sides of the opposing walls are touching.

Figure 2:
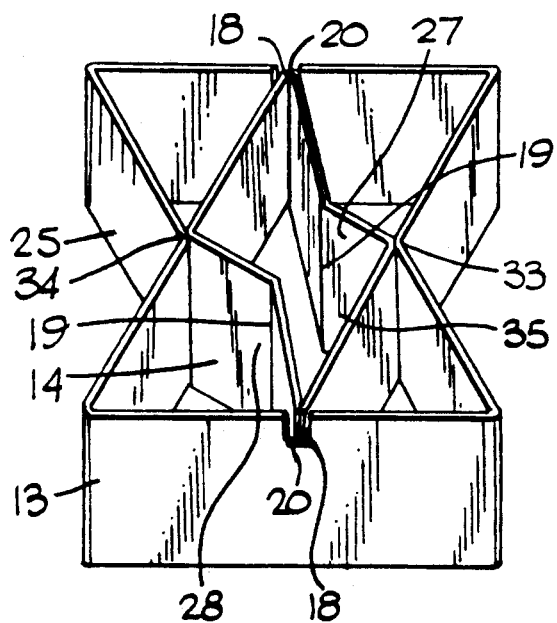
FIG. 2 shows an arrangement of the inner and outer base supports in a preferred embodiment of the invention.
Figure 3:
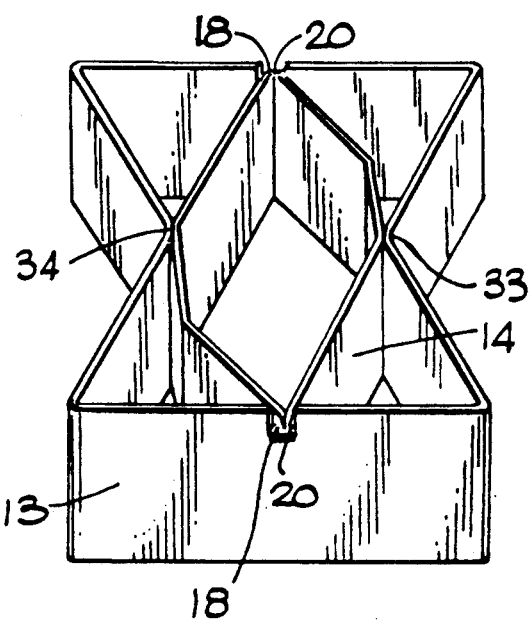
FIG. 3 shows an alternate arrangement of the inner and outer base supports in a preferred embodiment of the invention.

In a preferred embodiment of the invention, the outer base support and the inner base support are equipped with tabs that are designed to attach the two parts together at two points and stabilize the position of the inner support with respect to the outer support, FIGS. 2, 3. The outer base support has tabs 18 in the center on the top portion of the two walls 29, 30 adjacent to the opposing walls 25, 26. The inner base support has tabs 20 in the top portion of opposing corners 31, 32. The tabs of the inner and outer base supports are designed so that the base supports may be attached together at two points as is seen in FIGS. 2, 3 and hold the two support bases together in a fixed physical relationship.

In this preferred embodiment, the commode is assembled into its operational mode as follows. The outer base support 13 is placed over a hole dug in the ground, in its bow-tie configuration. The inner base support 14 is then placed inside the outer base support, and the two elements are physically attached by engaging the tabs. The inner base support is maintained so that the opposing walls 27, 28 are bent inwardly, as in FIG. 2. Next, the upper seat portion is placed over the top of the inner and outer base supports. In order to lock the lid into position above the supports, the assembler reaches into the opening 15 in the seat part 12, and forces the opposing walls 27, 28 of the inner base support to bend outwardly at the preformed creases 19, as seen in FIG. 3. Because the creases are formed so that the walls prefer to bend inwardly, the inner base support exerts outward pressure at the points 33, 34 where it comes into contact with the outer base support This action applies pressure to decrease the angle at the preformed creases 17 of the outer base support, thus creating tension to lock the seat part in place over the four corners of the outer base support.

In the preferred embodiment, the inner walls 35 of the inner base support 14 are coated with a waterproof surface in order to prevent the absorption of waste materials into the cardboard. When the inner surface of the inner base support is coated with a waxy substance, the entire commode may be buried in the ground after use and will still biodegrade within four months. This is possible because only the inner surface of the inner base support has been coated.

A further improvement of the invention includes a devise 21 for holding a roll of toilet tissue, FIG. 1. On the outer surface of one side of the edge 16 of the seat part 12, the cardboard material has been cut to provide two flaps 22. In the operational mode, the flaps are bent to a position perpendicular to the plane of the edge, FIG. 1. The flaps are equipped with slots 23 that are cut out of the flaps and that angle downwardly towards the edge 16. When in use, a straw or any other rod element can be suspended between the two flaps. Such a rod can be used to support a roll of tissue paper. When in the transport or storage mode, the flaps 22 are folded back into the plane of the edge 16.

Another embodiment of the invention is made up of the upper seat part element 12, and the outer base support 13 as described above, along with a triangular-shaped inner base support 36, as seen in FIG. 5. In this embodiment, the inner base support consists of an equilateral triangular-shaped element that has a preformed crease 37 in one wall 38 of the triangle. In the operational mode, the inner base support 36 is maintained in a triangular shape within the outer base support 13. In one form of this embodiment, the triangular inner base support 36 has tab elements 39 on the top portion at the preformed crease 37 and at the corner opposite the wall containing the preformed crease. These tabs are then engaged with the tabs 18 on the outer base support 13 in order to maintain the proper physical relationship between the inner and outer base supports, FIG. 5. In the transport mode, the inner base support is compacted by folding the wall inwardly at the preformed crease until the two sides of the wall are touching.

I claim:

1. A portable commode made of a biodegradeable material and having an operational mode and a transport mode comprising:

an outer base support configured as a rectangle with two opposing walls bent inwardly at preformed creases to form a bow-tie shape, that can be bent further at said preformed creases until almost flat when in the transport mode;

an inner base support that fits within said outer base, that can be folded almost flat when in the transport mode;

an upper seat part of lid-like construction which includes a top seat portion having an opening therein and downwardly extending edges, that fits over the top of said inner and outer base supports when in the operational mode;

said inner base support is configured as a rectangle with preformed creases in two opposing walls, so that said opposing walls may bend inwardly and outwardly, although tending to bend inwardly; said inner base support comprises an upper portion and a bottom portion and has first means for attachment on the upper portion at two opposite corners of said rectangle, said outer base support comprises an upper portion and a bottom portion and has second means for attachment on the upper portion in the center of the two walls adjacent to said opposing walls, and when in the operational configuration, said first means cooperate with said second means to hold the support bases together in a fixed physical relationship..

2. A portable commode as in claim 1 wherein said opposing walls of said inner base support are forced outwardly at said preformed creases to form an irregular hexagon shape, whereby said upper seat part is locked into position above and around said outer base support.

3. A portable commode as in claim 1 wherein the inner surface of said inner support base has a waterproof coating.

4. A portable commode as in claim 1 wherein the outer surface of one side of said downwardly extending edges has holding means for holding a roll of toilet tissue.

5. A portable commode as in claim 4 wherein said holding means consists of two flaps bent to a position perpendicular to said downwardly extending edge, said flaps having slots capable of supporting a rod element on which a roll of toilet tissue may be supported.

* * * * *